United States Patent
Hsu et al.

(10) Patent No.: US 9,634,776 B1
(45) Date of Patent: Apr. 25, 2017

(54) ADAPTING ENVELOPE TRACKING PARAMETERS TO OPERATING CONDITIONS OF MOBILE COMMUNICATION DEVICE

(71) Applicant: Amazon Technologies, Inc., Reno, NV (US)

(72) Inventors: Morris Yuanhsiang Hsu, Sunnyvale, CA (US); Mudit Sunilkumar Khasgiwala, Milpitas, CA (US); Peruvemba Ranganathan Sai Ananthanarayanan, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/663,213

(22) Filed: Mar. 19, 2015

(51) Int. Cl.
*H04W 72/00* (2009.01)
*H04B 17/16* (2015.01)
*H04W 24/10* (2009.01)
*H04B 1/04* (2006.01)

(52) U.S. Cl.
CPC ............ *H04B 17/16* (2015.01); *H04B 1/0458* (2013.01); *H04W 24/10* (2013.01); *H04B 2001/0416* (2013.01)

(58) Field of Classification Search
CPC ..................... H03F 2200/102; H03F 2200/451
USPC .................................. 455/73, 114.2; 330/75
See application file for complete search history.

(56) References Cited

U.S. PATENT DOCUMENTS

| | | | | |
|---|---|---|---|---|
| 2009/0289710 A1* | 11/2009 | Hardy | ..................... | G01S 1/024 330/251 |
| 2011/0223875 A1* | 9/2011 | Hamano | ............... | H03F 1/0222 455/127.1 |
| 2012/0302190 A1* | 11/2012 | McHenry | ............. | H04B 17/382 455/226.3 |
| 2013/0027129 A1* | 1/2013 | Langer | ................. | H04B 1/0458 330/127 |
| 2014/0029480 A1* | 1/2014 | Manku | .................. | H04B 1/525 370/278 |

(Continued)

OTHER PUBLICATIONS

Wang, Feipeng et al., "Design of Wide-Bandwidth Envelope-Tracking Power Amplifiers for OFDM Applications", IEEE Transactions on Microwave Theory and Techniques, Apr. 2005, vol. 53(4):1244-1255 http://3.www.sharetechnote.com/Docs/PA_EnvelopDetector_IEEE_FeipengWang.pdf.

*Primary Examiner* — Edward Urban
*Assistant Examiner* — Max Mathew
(74) *Attorney, Agent, or Firm* — Lowenstein Sandler LLP

(57) ABSTRACT

A mobile communication device may use sensor data to identify the current device state based on sensor data, device parameter values and/or device usage data. The mobile communication device may then measure the impedance value of a characteristic circuit, such as the antenna or the power amplifier. Responsive to determining that the measured impedance value differs from a pre-defined base impedance value by more than a certain threshold value, the mobile communication device may retrieve, from a memory, a set of envelope tracking (ET) parameter values corresponding to the current state of the communication device and the measured impedance value. The mobile communication device may calculate, using the retrieved ET parameter values, a target supply voltage to be applied to the power amplifier.

17 Claims, 7 Drawing Sheets

(56) References Cited

U.S. PATENT DOCUMENTS

| | | |
|---|---|---|
| 2014/0213196 A1 | 7/2014 | Langer et al. |
| 2014/0235185 A1 | 8/2014 | Drogi |
| 2014/0266444 A1* | 9/2014 | Scott .................... H03F 1/0227 330/257 |
| 2015/0023445 A1* | 1/2015 | Camuffo .................. H03F 1/02 375/268 |
| 2015/0035545 A1* | 2/2015 | Langer ................ H04W 52/226 324/629 |

* cited by examiner

ADAPTING ENVELOPE TRACKING PARAMETERS TO OPERATING CONDITIONS OF MOBILE COMMUNICATION DEVICE

BACKGROUND

Various mobile communication devices may be employed for data, voice, and/or video communications, as well as for consumption of digital content items, such as electronic books, video, and/or audio recordings. Such mobile communication devices may be represented by electronic book readers, cellular telephones, personal digital assistants (PDAs), portable media players, tablet computers, electronic pads, netbooks, desktop computers, notebook computers, and the like. These mobile communication devices may wirelessly communicate with communications infrastructure devices and/or other mobile computing devices to enable the consumption of the digital content items.

BRIEF DESCRIPTION OF THE DRAWINGS

The examples described herein will be understood more fully from the detailed description given below and from the accompanying drawings, which, however, should not be taken to limit the application to the specific examples, but are for explanation and understanding only.

DETAILED DESCRIPTION

Figure 1:
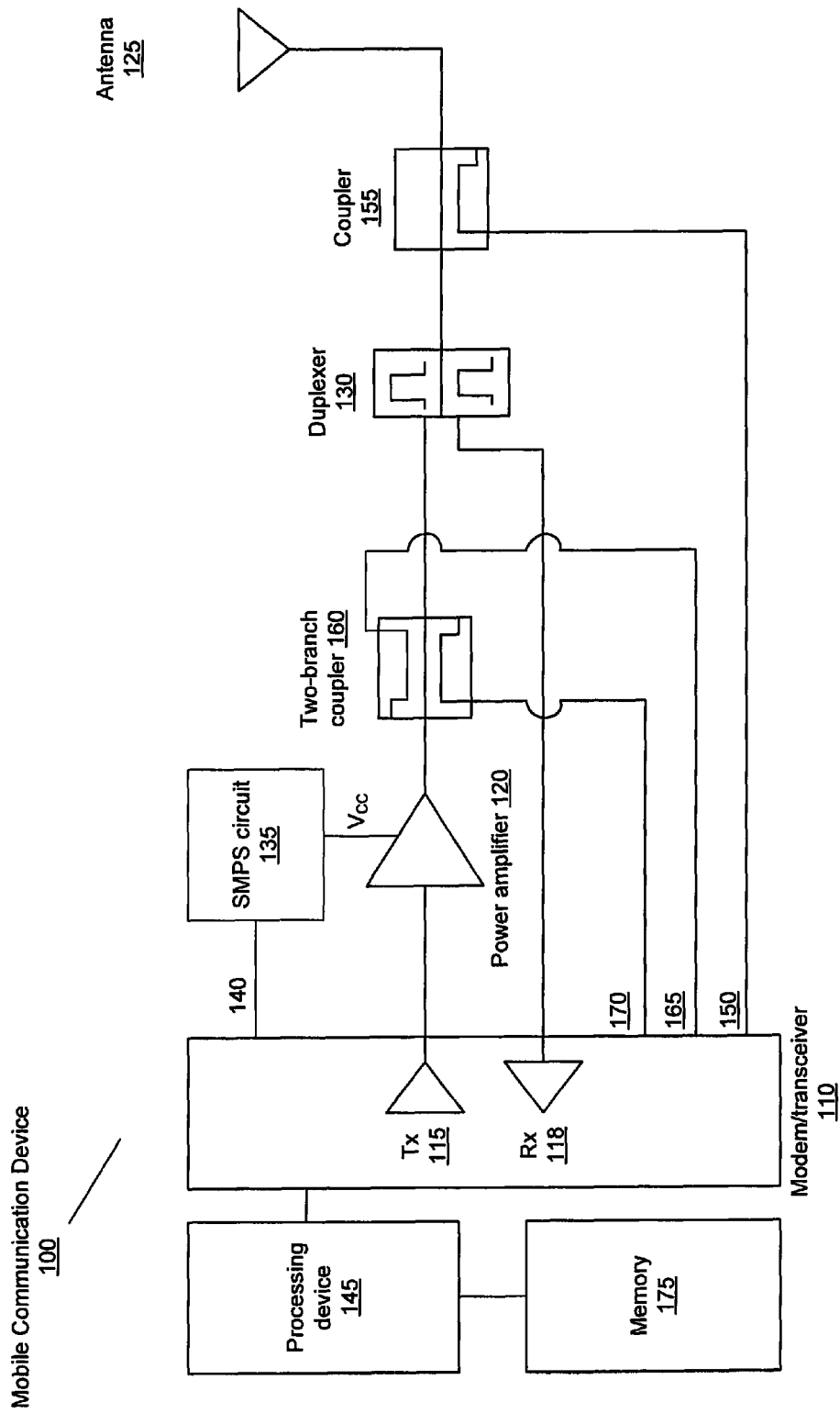
FIG. 1 is a high-level component diagram of an illustrative example of a mobile communication device operating in accordance with one or more aspects of the present disclosure.

Described herein are systems and methods for adapting envelope tracking (ET) parameters to operating conditions of a mobile communication device. Envelope tracking herein refers to an approach to radio frequency (RF) amplifier design in which a power supply voltage applied to the power amplifier is continuously adjusted to ensure that the amplifier is operating at peak efficiency for power required at each instant of transmission. Conventional RF amplifiers were designed with a fixed supply voltage and operate most efficiently only when operating in a compression or saturation mode. Amplifiers operating with a constant supply voltage, however, become less efficient as the crest factor of the signal increases. The amplifiers spend more time operating below peak power and, therefore, spend more time operating below maximum efficiency. Envelope tracking adjusts the voltage applied to an RF power amplifier to deliver the correct power needed at that instant. Envelope information is derived from the baseband signals and is passed to an envelope tracking power supply to provide the required voltage to drive the power amplifier into compression.

In certain implementations utilizing the envelope tracking technique, the supply voltage of the power amplifier is not a simple linear response to the magnitude of an input signal. For example, the supply voltage depends on the magnitude of input signal in a nonlinear way, such that the gain of power amplifier is constant and becomes independent of the instantaneous supply voltage when the power amplifier operates in an envelope tracking mode. An envelope tracking system may implement a nonlinear transfer function, the output of which controls the supply voltage to the power amplifier. Since the envelope tracking transfer function is nonlinear, it may be sensitive to values of various parameters of the mobile communication device, such as the antenna impedance or the power amplifier input impedance, which in turn may be affected by the device operating conditions (e.g., the device position relative to the user's body).

Systems and methods described herein may be employed to improve the power efficiency of a mobile communication device by adapting ET parameters to mobile device operating conditions, thus compensating for variations in the antenna impedance value, power amplifier input impedance value and/or other parameters of the mobile communication device.

An example mobile communication device may comprise an antenna, a power amplifier operatively coupled to the antenna and a switched mode power supply (SMPS) circuit employed to regulate the supply voltage applied to the power amplifier. In accordance with one or more aspects of the present disclosure, a processing device implementing the methods for adapting envelope tracking (ET) parameters to operating conditions of a mobile communication device described herein, may identify the current state reflecting the operating environment of the mobile communication device. The current state may be identified by characterizing the operating environment using sensor data, device parameter values, and/or device usage data, as described in more details herein below. Responsive to determining that the actual impedance value of a characteristic circuit (represented by the measured antenna impedance value or evaluated power amplifier input impedance value) differs from a pre-defined base impedance value by more than a threshold impedance difference value, the processing device may load, from a memory operatively coupled to the processing device, a set of ET parameter values corresponding to the device current state and the actual impedance value. The processing device may then use the ET parameter values to calculate a target supply voltage to be applied to the power amplifier. The processing device may produce a first control signal reflective of the target supply voltage, and transmit the first control signal to the SMPS circuit for regulating the supply voltage applied to the power amplifier. In certain implementations, the processing device may further produce a second control signal reflective of the target supply voltage, and transmit the second control signal to the transceiver feeding an RF signal to the power amplifier, as described in more details herein below.

In certain implementations, responsive to failing to locate in the memory a set of ET parameter values corresponding to the device current state and the actual impedance value, the processing device may optimize a certain amplifier efficiency indicator (such as the ratio of the amplifier output voltage to the amplifier supply voltage) by iteratively modifying one or more ET parameter values until the amplifier efficiency indicator reaches a maximal (or minimal) value. The processing device may then use the ET parameter values to calculate a target supply voltage to be applied to the power amplifier, as described in more details herein below.

Various aspects of the above referenced methods and systems are described in details herein below by way of example, rather than by way of limitation.

FIG. 1 is a high-level component diagram of an illustrative example of a mobile communication device operating in accordance with one or more aspects of the present disclosure. In various illustrative examples, mobile communication device 100 may be employed for voice and/or data communications with other communication devices or with base stations of a mobile communication network according to a certain mobile communication standard. Mobile communication device 100 may be provided by a mobile handset, such as a mobile phone or a smart phone, a tablet computer, a broadband modem, a base station of a mobile communication network, a laptop, a notebook, a router, a switch, a repeater, a personal computer (PC) or the like.

As illustrated by FIG. 1, mobile communication device 100 may comprise a modem/transceiver 110 having its RF signal output 115 electrically coupled to a power amplifier 120, the output signal of which is employed to drive an antenna 125. The RF signal input 118 of modem/transceiver 110 may be electrically coupled to antenna 125 via a duplexer 130. The supply voltage applied to power amplifier 120 may be regulated by a voltage regulator circuit, such as switched mode power supply (SMPS) circuit 135 based on one or more control signals 140 received from modem/transceiver 110.

In certain implementations, switched mode power supply (SMPS) circuit 135 may output variable supply voltage $V_{CC}$ to power amplifier 120 by implementing the envelope tracking technique, according to which the power amplifier supply voltage depends on the instantaneous envelope of Tx signal 115. In various illustrative examples, the power amplifier supply voltage $V_{CC}$ may depend on the magnitude of Tx signal 115 according to a non-linear transfer function that may be implemented by a processing device 145, which in various implementations may be communicatively coupled to or comprised by modem/transceiver 110. Processing device 145 may use envelope tracing methods to calculate a target supply voltage to be applied to power amplifier 120, convert the target supply voltage to an analog signal and feed the analog signal to SMPS circuit 135 via control signal line 140. In an illustrative example, processing device may determine an amplitude envelope of the signal as a square root of the sum $(I^2+Q^2)$, wherein I and Q represent the baseband signal components, and may calculate a target supply voltage that would track the amplitude envelope in order to minimize the power dissipation. In certain implementations, processing device 145 may further calculate a Tx signal 115 level to be applied to power amplifier 120, convert the Tx signal level to an analog signal and feed the analog signal to modem/transceiver 110.

Since the envelope tracking transfer function is nonlinear, it may be sensitive to values of various parameters of mobile communication device 100, such as the antenna impedance or the power amplifier input impedance, which in turn may be affected by the device operating conditions (e.g., the device position relative to the user's body).

Systems and methods described herein may be employed to improve the power efficiency of a mobile communication device by adapting ET parameters to mobile device operating conditions, thus compensating for variations in the antenna impedance value, power amplifier input impedance value and/or other parameters of the mobile communication device. Such ET parameters may include, but are not limited to, the ratio of the RF drive DAC value to the RF output sweep, the delay between the fast vector modulator bias and the RF envelope for the time alignment, input and output power ($P_{IN}$ and $P_{OUT}$) characterization and/or AM/AM and AM/PM characterization for applying digital pre-distortion.

In accordance with one or more aspects of the present disclosure, processing device 145 may identify the current state reflecting the operating environment of mobile communication device 100. In an illustrative example, the device current state may be identified by characterizing the operating environment using sensor data received from one or more sensors comprised by and/or associated with mobile communication device 100. Examples of such sensors include: a thermistor employed to measure the temperature at the power amplifier junction and/or modem chipset of mobile communication device 100, a current sensor employed to measure values of the current flowing through certain circuits of mobile communication device 100, a proximity sensor employed to detect the presence of an external object without a physical contact with such an object, a geo-location sensor employed to determine the geo-position of mobile communication device 100, an accelerometer employed to determine the proper acceleration values of mobile communication device 100 along one or more axes, or an optical sensor employed to convert an optical signal received via one or more lenses to an electrical signal.

In certain implementations, the current state of mobile communication device 100 may be identified by characterizing the operating environment using values of one or more device parameters, such as device battery voltage level, received signal strength, antenna impedance, frequency band and channel, etc.

In certain implementations, the current state of mobile communication device 100 may be identified by characterizing the operating environment using values of one or more device usage parameters, such as a parameter indicating that the mobile communication device is engaged in a voice call and/or a parameter indicating that the mobile communication device is engaged in data transmission.

Examples of possible device states identifiable by processing device 145 using the sensor data, device parameter values and/or device usage data may include: the device is being held against the user's body (e.g., the user's head for mobile phones or the user's lap for portable computers); the device is being held against a metal surface; the device is being held at least a certain distance from any relatively large objects (e.g., objects that are larger than the mobile communication device); the antenna detuning state caused by certain accessories being plugged into mobile communication device connectors; etc.

In certain implementations, the current state of mobile communication device may be identified by an output of a function that is based on evaluating one or more logical expressions, such that each logical expression compares a sensor data value, a device parameter value, or a device usage parameter value to a corresponding threshold value. In an illustrative example, such a function may be represented by a look-up table the entries of which store values of one or more values of sensor data, device parameters, or device usage data. In another illustrative example, the state identifying function may be represented by an executable code module.

Upon identifying the current state of the mobile communication device, processing device 145 may evaluate the difference of the actual impedance value of a characteristic circuit (an antenna or a power amplifier) of the mobile communication device and a base impedance value. In certain implementations, the actual impedance value may be represented by the measured antenna impedance value, based on coupled port signal 150 originated by coupler 155 and reflective of the incident power level at the antenna, as schematically illustrated by FIG. 1. Alternatively, the actual impedance value may be represented by the input impedance value of power amplifier 120, which may be evaluated by measuring the incident power and the reflected power at the output of power amplifier 120. Such measurement may be accomplished by equipping mobile communication device 100 with a two-branch coupler 160 employed to output coupled port signals 165 and 170, which may be used for evaluating the incident power and the reflected power at the output of power amplifier 120. Processing device 145 may evaluate the input port voltage reflection coefficient of power amplifier 120, as being proportional to the ratio of the reflected power to the incident power value. Processing device 145 may then use the value of the input port voltage reflection coefficient for determining the input impedance value: $Z_L=(1+s_{11})/(1-s_{11})*Z_0$, wherein $Z_L$ is the input impedance, $s_{11}$ is the input port voltage reflection coefficient, and $Z_0$ is the characteristic impedance of the power transmission line.

Responsive to determining that the actual impedance value of the characteristic circuit (represented by the measured antenna impedance value or evaluated power amplifier input impedance value, as noted herein above) differs from a base impedance value by more than a threshold impedance difference value, processing device 145 may load, from a memory 175 operatively coupled to processing device 145, a set of ET parameter values corresponding to the device current state and the actual impedance value. In various illustrative examples, memory 175 may comprise volatile and/or non-volatile memory devices, such as DRAM, SDRAM, flash memory, etc.

The base impedance value is usually 50 Ohm, but may be implementation-specific. The threshold impedance difference value may represent an impedance difference value, which, if exceeded, may yield a significantly sub-optimal operational mode of the power amplifier, and thus may need to be compensated by varying the values of one or more ET parameters. In other words, if the difference between the actual impedance value and the base impedance value does not exceed the threshold impedance difference value, such an impedance variation does not significantly affect the operation of the power amplifier, and the base set of ET parameter values may be employed for controlling the power amplifier voltage. Otherwise, if the difference between the actual impedance value and the base impedance value exceeds the threshold impedance difference value, such an impedance variation may significantly affect the operation of the power amplifier to the extent of driving the power amplifier in a sub-optimal operational mode, and thus the values of one or more ET parameters may need to be varied to compensate for the impedance difference. The threshold impedance value may be, e.g., 1 Ohm, 5 Ohm, 10 Ohm or other implementation-specific configurable value.

Figure 2:
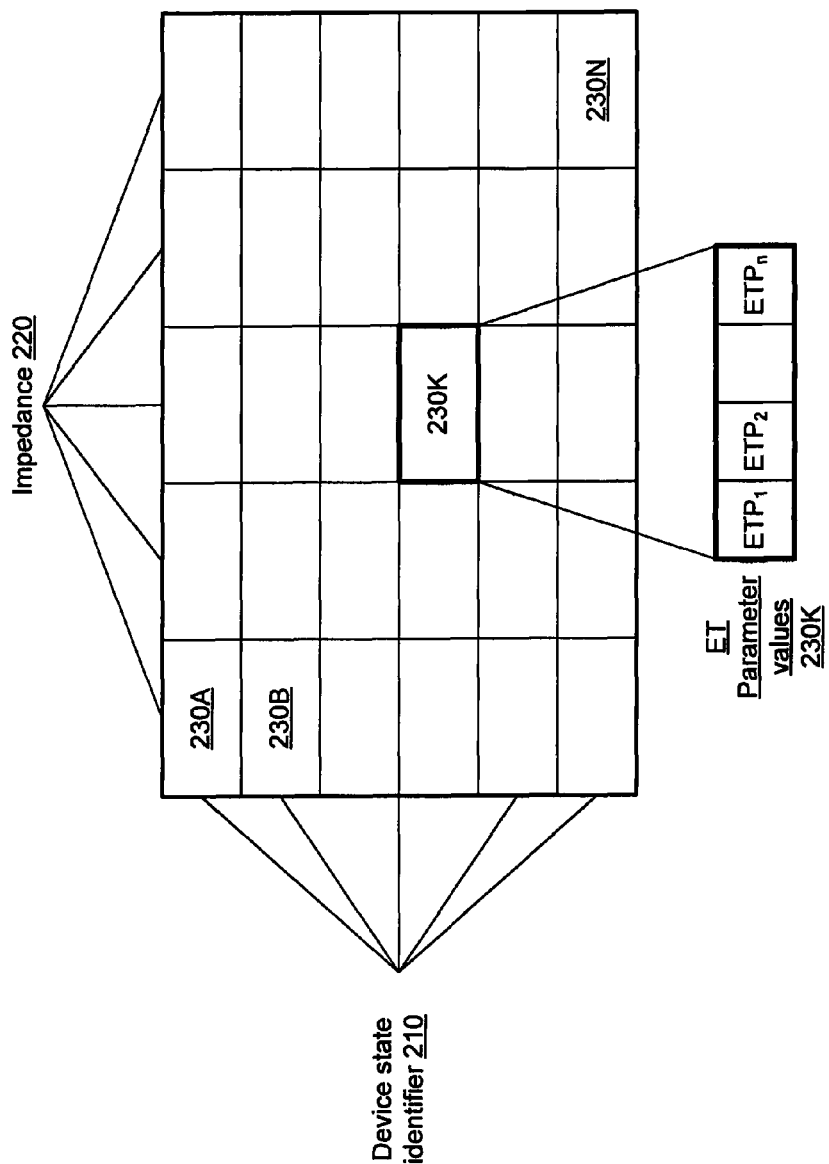
FIG. 2 schematically illustrates a memory data structure that may be employed for storing multiple sets of ET parameter values, in accordance with one or more aspects of the present disclosure.

FIG. 2 schematically illustrates a memory data structure that may be employed for storing multiple sets of ET parameter values, in accordance with one or more aspects of the present disclosure. As schematically illustrated by FIG. 2, memory data structure 200 may be represented by a rectangular look-up table indexed by the device state identifier 210 and by the impedance value 220. Each table entry 230A-230N may store a set of values of ET parameters corresponding to a certain device state and to a certain impedance value. FIG. 2 schematically illustrates an exploded view of a table entry 230K that stores a vector of ET parameter values $ETP_1, \ldots, ETP_n$. As noted herein above, such ET parameters may include, but are not limited to, the ratio of the RF drive DAC value to the RF output sweep, the delay between the fast vector modulator bias and the RF envelope for the time alignment, input and output power ($P_{IN}$ and $P_{OUT}$) characterization and/or AM/AM and AM/PM characterization for applying digital pre-distortion.

The set of ET parameter values may comprise values of one or more values of the above listed ET parameters, which may be stored in the memory at the device production stage, at post-production calibration, or at any time during the useful life of the device. Processing device 145 may then use the ET parameter values to produce SMPS control signals that may be transmitted to SMPS circuit 135 for regulating the supply voltage applied to power amplifier 120.

In certain implementations, responsive to failing to locate in the memory a set of ET parameter values corresponding to the device current state and the actual impedance value, processing device 145 may perform on-the-fly optimization of a certain amplifier efficiency indicator that is sensitive to one or more ET parameter values. In an illustrative example, the efficiency indicator of the power amplifier may be provided by the ratio of the output voltage of the amplifier to the supply voltage of the amplifier.

Processing device may iteratively modify one or more ET parameter values in accordance with a certain optimization method (such as simulated annealing), until the amplifier efficiency indicator reaches a quasi-optimal value. "Quasi-optimal value" herein shall refer to a value which is either globally optimal (maximum or minimum) among all possible candidate values of the chosen amplifier efficiency indicator, or locally optimal among a certain subset of candidate values of the chosen amplifier efficiency indicator. In certain implementations, processing device 145 may identify a set of ET parameter values corresponding to a device state that is similar, as determined by a pre-defined metric, to the current device state, and use those ET parameter values as initial values for the above described optimization procedure.

In certain implementations, processing device 145 may omit the operations of determining the current state of mobile communication device 100 and retrieving a corresponding set of the ET parameter values from memory 175 and perform the above described optimization procedure using a set of pre-defined, randomly generated, or otherwise determined ET parameter values as initial values for the above described optimization procedure.

Processing device 145 may then use the quasi-optimal set of ET parameter values to calculate a target supply voltage to be applied to power amplifier 120. Processing device 145 may produce a first control signal reflective of the target supply voltage, and transmit the first control signal to SMPS circuit 135 for regulating the supply voltage applied to power amplifier 120. In certain implementations, processing device 145 may further produce a second control signal reflective of the target supply voltage, and transmit the second control signal to modem/transceiver 110 feeding an RF signal 115 to power amplifier 120.

The above described ET parameter adjustment procedure may be continuously implemented by processing device 145 during the operation of mobile communication device 100, thus improving the device power efficiency.

In certain implementations, at the device production stage, at post-production calibration, or at any time during the useful life of the device, multiple sets of ET parameter values corresponding to various device states and impedance values may be stored in memory 175 (e.g., using data structure 200). In an illustrative example, mobile communication device 100 may be sequentially put in each of a number of pre-determined states. For each device state, a set of the corresponding sensor data values, a set of device parameters values and/or a set of device usage parameter values may be stored in a data structure that is employed for device state identification. Further for each device state, processing device 145 may optimize a certain amplifier efficiency indicator (such as the ratio of the amplifier output voltage to the amplifier supply voltage) by iteratively modifying one or more ET parameter values until the amplifier efficiency indicator reaches a quasi-optimal value. Processing device 145 may then save the quasi-optimal set of ET parameter values in memory data structure 200 in association with the device state identifier and the actual impedance value (represented by the antenna impedance or the amplifier input impedance). For each device state, the ET parameter value optimization and storing operations may be repeated for two or more impedance values (represented by the antenna impedance or the amplifier input impedance).

Figure 3:
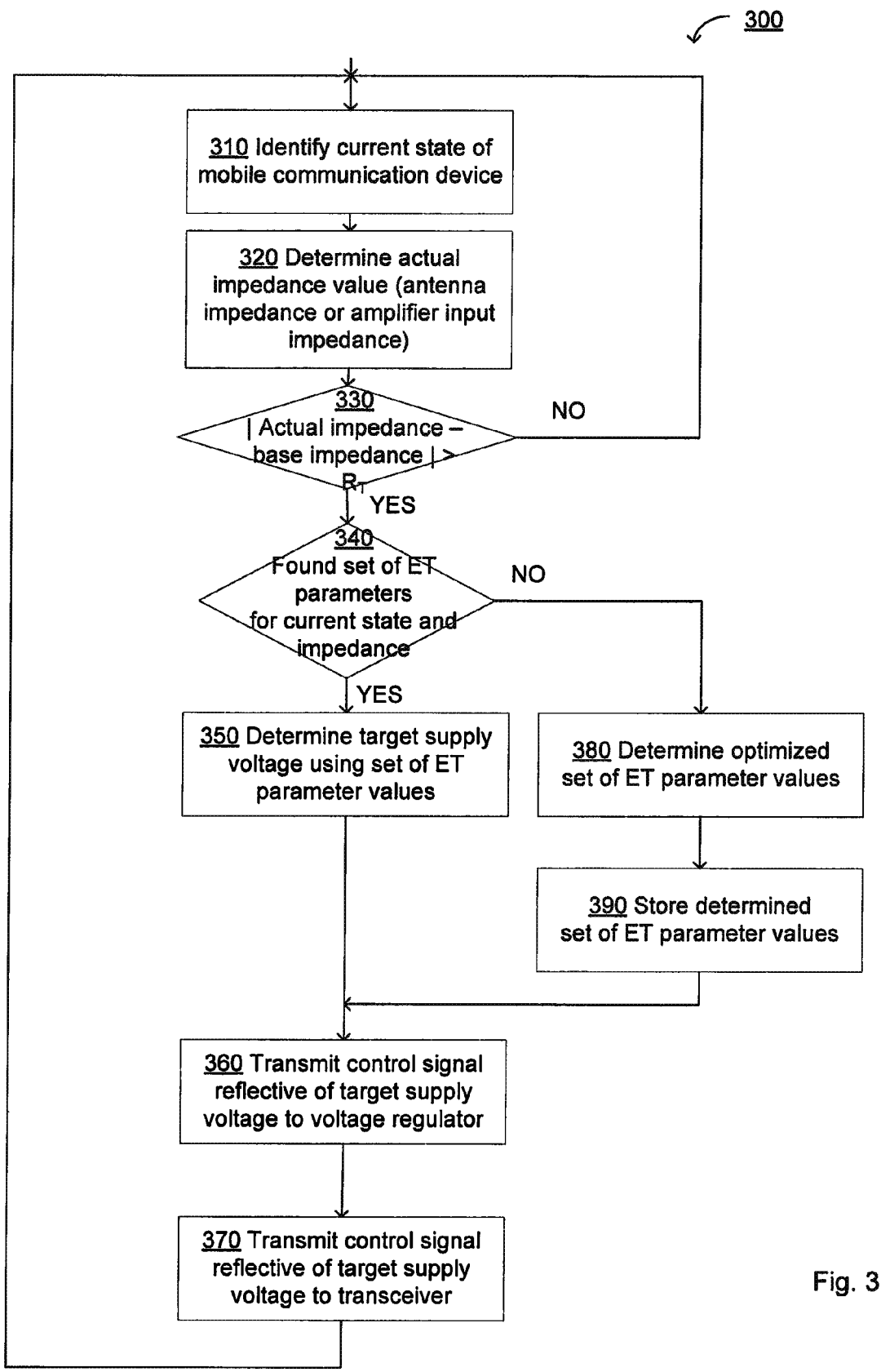
FIG. 3 is a flow diagram of an illustrative example of a method for adapting envelope tracking (ET) parameters to operating conditions of a mobile communication device, in accordance with one or more aspects of the present disclosure.

FIG. 3 is a flow diagram of an illustrative example of a method for adapting envelope tracking (ET) parameters to operating conditions of a mobile communication device, in accordance with one or more aspects of the present disclosure. Method 300 may be performed by processing logic that comprises hardware (e.g., circuitry, dedicated logic, programmable logic, microcode, etc.), software (e.g., instructions run on a processor to perform hardware simulation), or a combination thereof. In certain implementations, method 300 may be performed by mobile communication device 100 of FIG. 1.

Referring to FIG. 3, at block 310, the processing device implementing the method may identify the current state of the communication device. In various illustrative examples, the device state may be identified using sensor data received from one or more sensors comprised by and/or associated with mobile communication device, values of one or more parameters of the mobile communication device and/or device usage data, as described in more details herein above. The sensors employed for identifying the device state may comprise a temperature sensor, a current sensor, a proximity sensor, a geo-location sensor, an accelerometer, or an optical sensor. In certain implementations, the current state of mobile communication device may be identified by an output of a function that is based on evaluating one or more logical expressions, such that each logical expression compares a sensor data value, a device parameter value, or a device usage parameter value to a corresponding threshold value, as described in more details herein above.

At block 320, the processing device may determine the actual impedance value represented by the antenna impedance value or the amplifier input impedance value. The antenna impedance value may be measured using a coupled port signal originated by a coupler that is electrically coupled to the antenna. The amplifier input impedance value may be evaluated by measuring the incident power and the reflected power at the output of power amplifier, as described in more details herein above.

Responsive to determining, at block 330, that the actual impedance value differs from a base impedance value by more than a threshold impedance difference value, the processing may continue at block 340. Otherwise, the method may loop back to block 310. In various illustrative examples, the base impedance value may be 50 Ohm. In various illustrative examples, the threshold impedance difference value may be, e.g., 1 Ohm, 5 Ohm, 10 Ohm or other implementation-specific configurable value.

Responsive to locating, at block 340, in a memory data structure, a set of envelope tracking (ET) parameter values corresponding to the current state of the communication device and the actual impedance value, the processing may continue at block 350; otherwise, the method may branch to block 380. The memory data structure employed for storing multiple sets of ET parameter values corresponding to various communication device states and impedance values may be represented by a rectangular look-up table indexed by the device state identifier and by the impedance value, as described in more details herein above. Such ET parameters may include, but are not limited to, the ratio of the RF drive DAC value to the RF output sweep, the delay between the fast vector modulator bias and the RF envelope for the time alignment, input and output power ($P_{IN}$ and $P_{OUT}$) characterization and/or AM/AM and AM/PM characterization for applying digital pre-distortion.

At block 350, the processing device may determine, using the set of ET parameter values retrieved from the memory data structure, a target supply voltage value to maximize an efficiency indicator of the power amplifier. In an illustrative example, the efficiency indicator of the power amplifier may be provided by the ratio of the output voltage of the amplifier to the supply voltage of the amplifier. In an illustrative example, processing device may determine an amplitude envelope of the signal as a square root of the sum ($I^2+Q^2$), wherein I and Q represent the baseband signal components, and may calculate a target supply voltage that would track the amplitude envelope in order to minimize the power dissipation, as described in more details herein above.

At block 360, the processing device may produce a first control signal reflective of the target supply voltage, and transmit the first control signal to the SMPS circuit for regulating the supply voltage applied to the power amplifier.

At block 370, the processing device may further produce a second control signal reflective of the target supply voltage, and transmit the second control signal to the transceiver feeding an RF signal to the power amplifier, as described in more details herein above, and the method may loop back to block 310.

At block 380, the processing device may perform on-the-fly optimization of a certain amplifier efficiency indicator that is sensitive to one or more ET parameter values. In an illustrative example, the efficiency indicator of the power amplifier may be provided by the ratio of the output voltage of the amplifier to the supply voltage of the amplifier. Processing device may iteratively modify one or more ET parameter values in accordance with a certain optimization method (such as simulated annealing), until the amplifier efficiency indicator reaches a quasi-optimal value, as described in more details herein above.

At block 390, the processing device may store, in the above referenced data structure, the identified set of ET parameter values in association with the identifier of the current device state and the actual impedance value, and the processing may continue at block 360.

Figure 4:
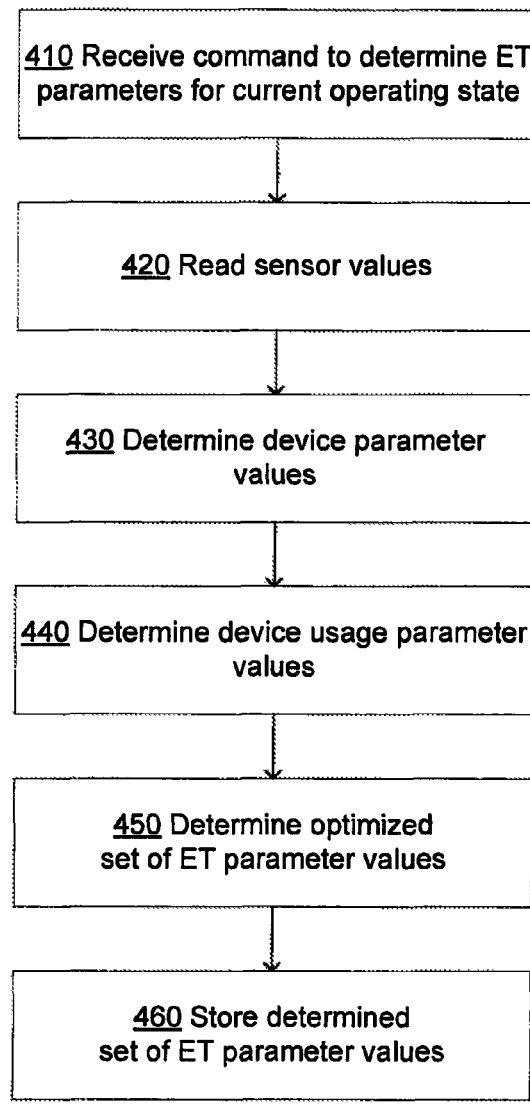
FIG. 4 is a flow diagram of another illustrative example of a method adapting envelope tracking (ET) parameters to operating conditions of a mobile communication device, in accordance with one or more aspects of the present disclosure.

FIG. 4 is a flow diagram of an illustrative example of a method for determining envelope tracking (ET) parameters corresponding to various device states of a mobile communication device, in accordance with one or more aspects of the present disclosure. Method 400 may be performed by processing logic that comprises hardware (e.g., circuitry, dedicated logic, programmable logic, microcode, etc.), software (e.g., instructions run on a processor to perform hardware simulation), or a combination thereof. Method 400 may be performed at the device production stage, at post-production calibration, or at any time during the useful life of the device. In certain implementations, method 400 may be performed by computer system 700 of FIG. 7 and/or by mobile communication device 100 of FIG. 1.

Referring to FIG. 4, at block 410, the processing device implementing the method may receive a command indicating that the mobile communication device is in a certain operating state, the ET parameters for which should be determined and stored in memory. In various illustrative examples, the command may be received via a user interface (e.g., a button or a GUI command) or via a communication interface.

At block 420, the processing device may read values of one or more sensors associated with the mobile communication device. The sensors may include a temperature sensor, a current sensor, a proximity sensor, a geo-location sensor, an accelerometer, and/or an optical sensor, as described in more details herein above.

At block 430, the processing device may determine values of one or more device parameters of the mobile communication device. Examples of device parameters include device battery voltage level, received signal strength, antenna impedance, frequency band and channel, etc.

At block 440, the processing device may determine values of one or more device usage parameters, such as a parameter indicating that the mobile communication device is engaged in a voice call and/or a parameter indicating that the mobile communication device is engaged in data transmission.

At block 450, the processing device may determine a set of ET parameter values corresponding to the current state of the mobile communication device, by optimizing a certain amplifier efficiency indicator that is sensitive to one or more ET parameter values. In an illustrative example, the efficiency indicator of the power amplifier may be provided by the ratio of the output voltage of the amplifier to the supply voltage of the amplifier. Processing device may iteratively modify one or more ET parameter values in accordance with a certain optimization method (such as simulated annealing), until the amplifier efficiency indicator reaches a quasi-optimal value, as described in more details herein above.

At block 460, the processing device may store, in the above referenced data structure, the identified set of ET parameter values in association with the identifier of the current device state and the actual impedance value. The identifier of the current device state may be derived from one or more sensor data values, one or more device parameter values, and/or one or more device usage parameter values. Responsive to completing operations described with references to block 460, the method may terminate.

Figure 5:
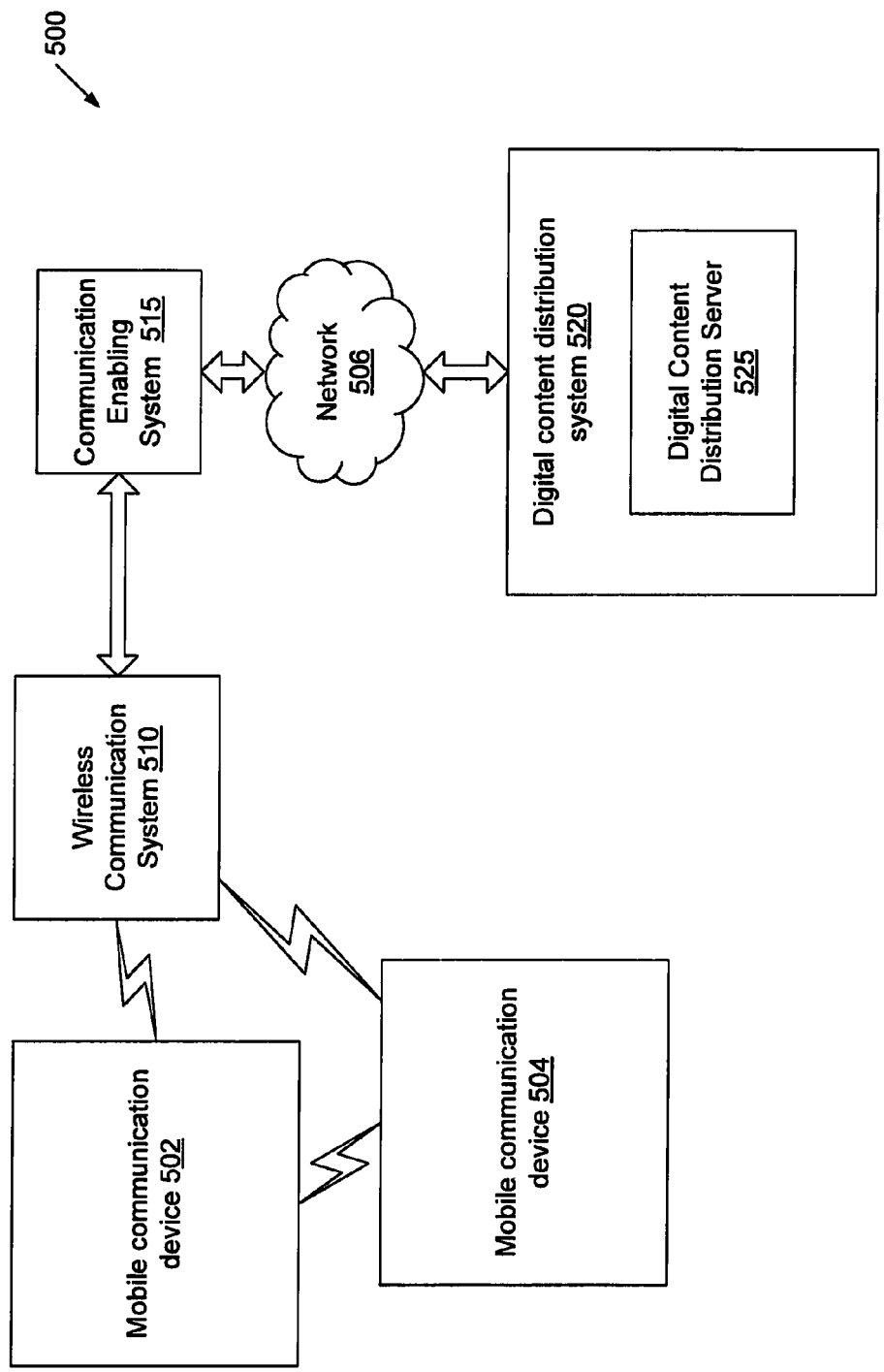
FIG. 5 is a high-level component diagram of an example network architecture, in which an example mobile communication device may operate.

FIG. 5 is a high-level component diagram of an example network architecture, in which an example mobile communication device may operate. Network architecture 500 may include a digital content distribution system 520 and one or more mobile communication devices 502, 504 capable of communicating with the digital content distribution system 520 via a network 506. Network 506 may include, for example, a public network such as the Internet or a private network such as a local area network (LAN) and may include a wired or wireless network.

Mobile communication devices 502, 504 may be portable computing devices such as electronic book readers or tablet computers (e.g., that include a book reader application). Other examples of mobile communication devices include cellular telephones, personal digital assistants (PDAs), portable media players, netbooks and the like. Mobile communication device 502, 504 may be represented by mobile communication device 100 of FIG. 1. Mobile communication device 502, 504 may be variously configured with different features to enable consumption of one or more types of digital content and electronic media items. The digital content and electronic media items may include electronic books (ebooks) and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.) which may be available from a video-on-demand (VOD) service, images (e.g., art, photographs, etc.) and multi-media content.

Digital content distribution system 520 may correspond to any feature or combination of features for providing electronic media items or other digital content to mobile communication device 502, 504 502, 504. Digital content distribution system 520 may include a network-accessible server-based functionality (digital content distribution server 525), various data stores (not shown) and/or other data processing equipment. Digital content distribution system 520 may be implemented by a single machine or a cluster of machines. Digital content distribution system 520 may include one or more machines (e.g., one or more server computer systems, routers, gateways, etc.) that have processing and storage capabilities to provide the server-based functionality.

In certain implementations, the digital content distribution server 525 corresponds to an entity which provides electronic media items (e.g., electronic books, videos) to users upon the users' purchase of the items. In this role, the digital content distribution server 525 may essentially act as a bookseller or the like. In other cases, the digital content distribution server 525 corresponds to an entity which provides electronic publications to users on a non-fee basis or on the basis of some other type of alternative compensation arrangement.

Digital content distribution server 525 may deliver and mobile communication device 502, 504 receive, electronic publications (or other media items), search results, upgrades and/or other information via network 506. For example, mobile communication devices 502, 504 may download, stream, or otherwise receive digital video from the digital content distribution server 525. Digital content distribution server 525 may also receive various requests (e.g., search queries), instructions and other data from the mobile communication devices 502, 504 via the network 506.

Communication between the mobile communication devices 502, 504 and digital content distribution system 520 may be enabled via any communication infrastructure. One example of such an infrastructure includes a combination of a wide area network (WAN) and wireless infrastructure, which allows a user to use mobile communication devices 502, 504 to purchase digital content (e.g., digital video or electronic publications) and consume the digital content without being tethered to the digital content distribution system 520 via hardwired links. The wireless infrastructure may be provided by one or multiple wireless communications systems, such as wireless communication system 510. In certain implementations, wireless communication system 510 may be a wireless fidelity (WiFi) hotspot connected with the network 506. Wireless communication system 510 may also be a wireless carrier system that can be implemented using various data processing equipment, communication towers, etc. For example, wireless communication system 510 may include a Global System for Mobile Communications (GSM) network, a Universal Mobile Telecommunications System (UMTS) system, a 5GPP Long Term Evolution (LTE) system, or other system. Alternatively, or in addition, the wireless carrier system may rely on satellite technology to exchange information with mobile communication devices 502, 504.

The communication infrastructure may also include a communication-enabling system 515 that serves as an intermediary in passing information between digital content distribution system 520 and wireless communication system 510. The communication-enabling system 515 may communicate with wireless communication system 510 (e.g., a wireless carrier) via a dedicated channel and may communicate with digital content distribution system 520 via a non-dedicated communication mechanism, (e.g., a public Wide Area Network (WAN) such as the Internet).

In addition to wirelessly connecting to wireless communication system 510, mobile communication devices 502, 504 may also wirelessly connect to other mobile communication devices 502, 504. For example, mobile communication device 502 may form a wireless ad hoc (peer-to-peer) network with mobile communication device 504 using WiFi, Bluetooth, or other wireless communication protocols.

Figure 6:
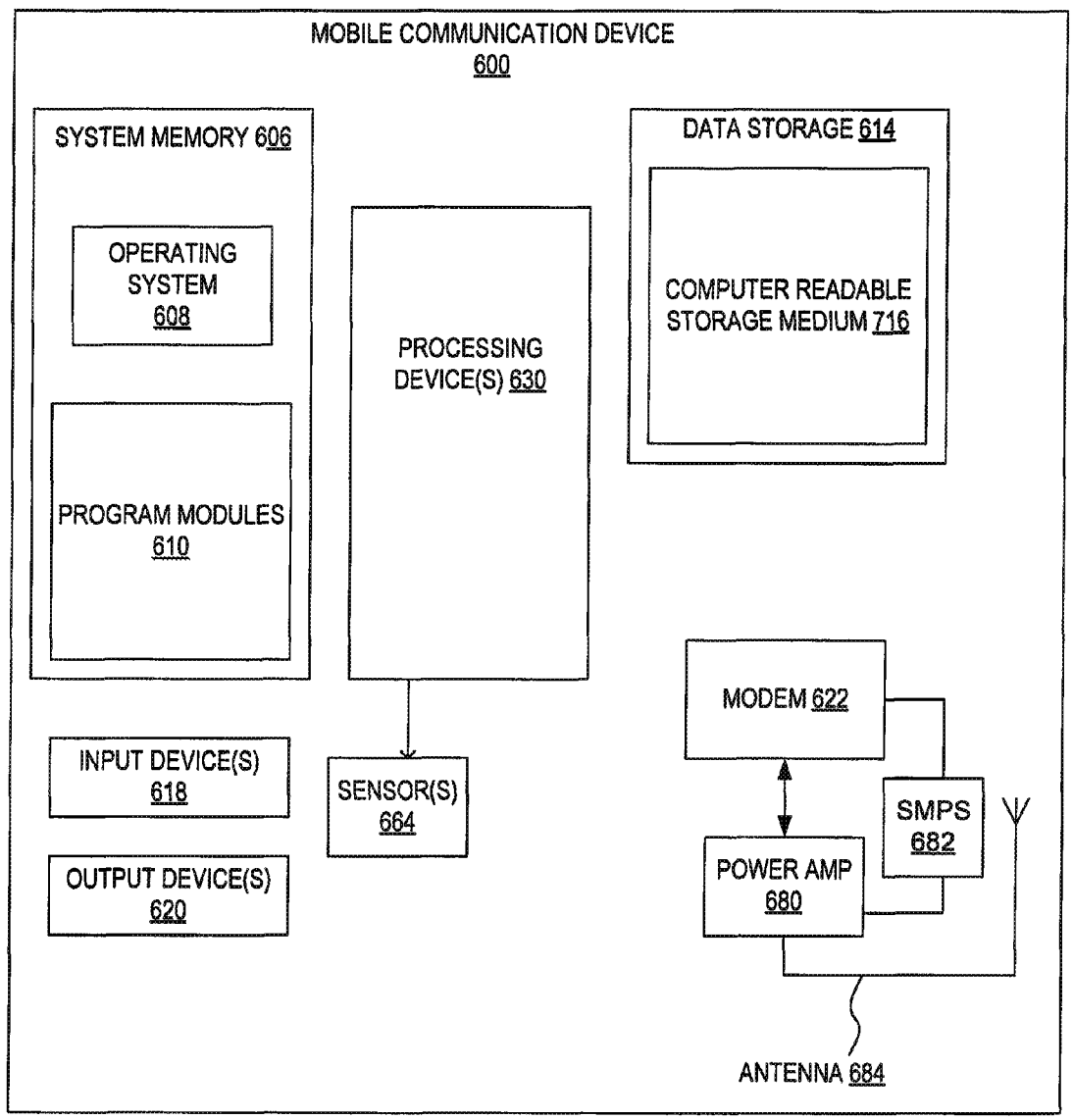
FIG. 6 is a more detailed component diagram of an illustrative example of a mobile communication device operating in accordance with one or more aspects of the present disclosure.

FIG. 6 is a more detailed component diagram of an illustrative example of a mobile communication device operating in accordance with one or more aspects of the present disclosure. In certain implementations, mobile communication device 600 may correspond to mobile communication device 200 of FIG. 2 and may be any type of mobile communication device such as an electronic book reader, a PDA, a mobile phone, a laptop computer, a portable media player, a tablet computer, an electronic pad, a desktop computer, a camera, a video camera, a netbook and the like.

Mobile communication device 600 includes one or more processing devices 630, such as one or more CPUs, microcontrollers, field programmable gate arrays, or other types of processors. In certain implementations, processing devices 630 correspond to processing device 145 of FIG. 1. Mobile communication device 600 also includes system memory 606, which may correspond to any combination of volatile and/or non-volatile storage devices. System memory 606 stores information which is consumed by an operating system component 608, various program modules 610 and/or other components. In certain implementations, system memory 606 comprises memory 175 of FIG. 1. Mobile communication device 600 performs various functions by using processing device(s) 630 to execute instructions stored by system memory 606.

Mobile communication device 600 also includes a data storage device 614 that may comprise one or more types of removable storage and/or one or more types of non-removable storage. Data storage device 614 includes a computer-readable storage medium 616 on which are stored one or more sets of instructions embodying the methods described herein. As shown, the instructions may reside, completely or at least partially, within computer readable storage medium 616, system memory 606 and/or within processing device(s) 630 during execution thereof by mobile communication device 600, system memory 606 and processing device(s) 630 also constituting computer-readable media. Mobile communication device 600 may also include one or more input devices 618 (keyboard, mouse device, specialized selection keys, etc.) and one or more output devices 620 (displays, printers, audio output mechanisms, etc.).

Mobile communication device 600 further includes a wireless modem 622 to allow mobile communication device 600 to communicate via a wireless network (e.g., such as provided by the wireless communication system) and/or with other computing devices, such as remote computers, the item providing system, online book stores, electronic catalogs for libraries and so forth. Wireless modem 622 may allow mobile communication device 600 to handle both voice and non-voice communications (such as communications for text messages, multimedia messages, media downloads, web browsing, etc.) with the wireless communication system. Wireless modem 622 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed downlink packet access (HSDPA), WiFi, etc. Wireless modem 622 may generate signals and send these signals to power amplifier (amp) 680 for amplification, after which they are wirelessly transmitted via antenna 684. In addition to sending data, antenna 684 also receives data, which is sent to wireless modem 622 and transferred to processing device(s) 630. In certain implementations, modem 622, power amplifier 680, SMPS circuit 682 and antenna 684 correspond to the respective components of FIG. 1.

In certain implementations, mobile communication device 600 includes one or more sensors 664. Examples of such sensors include: a temperature sensor employed to measure the temperature inside and/or outside of the housing of mobile communication device 600, a current sensor employed to measure values of the current flowing through certain circuits of mobile communication device 600, a proximity sensor employed to detect the presence of an external object without a physical contact with such an object, a geo-location sensor employed to determine the geo-position of mobile communication device 600, an accelerometer employed to determine the proper acceleration values of mobile communication device 600 along one or more axes, or an optical sensor employed to convert an optical signal received via one or more lenses to an electrical signal.

The optical sensor may be a low resolution camera (e.g., having 0.2 or 0.3 Megapixels) that takes images (e.g., of a user's eyes) on a periodic basis. Alternatively, the optical sensor may have a higher resolution, such as 1 Megapixel up to 10 or more Megapixels. The optical sensor may be positioned such that images are taken of a user's face while the user holds mobile communication device 600 in front of his face in a standard reading position. Therefore, optical sensor 664 may be used to track user eye movement during reading.

The proximity sensor can be employed detect the presence of human body parts and convey information regarding the detected presence to processing device(s) 630. In certain implementations, the proximity sensor may be provided by a capacitive sensor that is configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative implementation, the proximity sensor may also be provided by an optical (e.g., infrared) sensor that use an emitter and receiver pair to detect the presence of opaque objects. Alternatively, the proximity sensor may be provided by an inductive sensor, which includes an inductive loop. When the presence of a human body part (or metal object) is brought close to the inductive sensor, an induction of the inductive loop changes, causing the human body part to be detected.

Alternatively, the proximity sensor may be provided by an ultrasonic sensor that emits an ultrasonic signal and measure a time duration between when a signal is transmitted and the reflection of that signal received (a.k.a., flight response). Sensors 664 may also include other types of sensors, such as those that operate using the detection principles of resistive (e.g., analog resistive, digital resistive or residual resistive), surface acoustic wave, electromagnetic, near field imaging, or other technologies. In certain implementations, multiple different types of sensors are used. Though the detected object is described herein as a human body part, other types of objects may also be detected depending on the sensing technologies used.

In certain implementations, the motion sensor may be provided by an accelerometer or one or more gyroscopes. Mobile communication device 600 may use motion data from motion sensors to determine whether a user is holding mobile communication device 600. For example, if mobile communication device 600 experiences constant minor accelerations, it may be determined that mobile communication device 600 is being held in a user's hand. Additionally, if mobile communication device 600 is at a particular angle (detectable based on acceleration readings from an accelerometer), it may be determined that the mobile communication device 600 is being rested on a user's leg during reading.

Processing device 630 may include sensor circuitry 635 (e.g., sensor device drivers) that enables processing device 630 to interpret signals received from sensors 664. In certain implementations, sensors 664 output raw sensor data. Alternatively, sensors 664 output fully processed signals to processing device 630. For example, a sensor 664 may output a user contact/no user contact signal using a single line interface or a multi-line interface. In another example, sensors 664 output positional data and/or object presence data (e.g., of a human body part) to processing device 630 without first processing the data. In either instance, processing device 630 may use sensor circuitry 635 to process and/or interpret the received data. If data is received from multiple sensors, processing the data may include averaging the data, identifying a maximum from the data, or otherwise combining the data from the multiple sensors.

Figure 7:
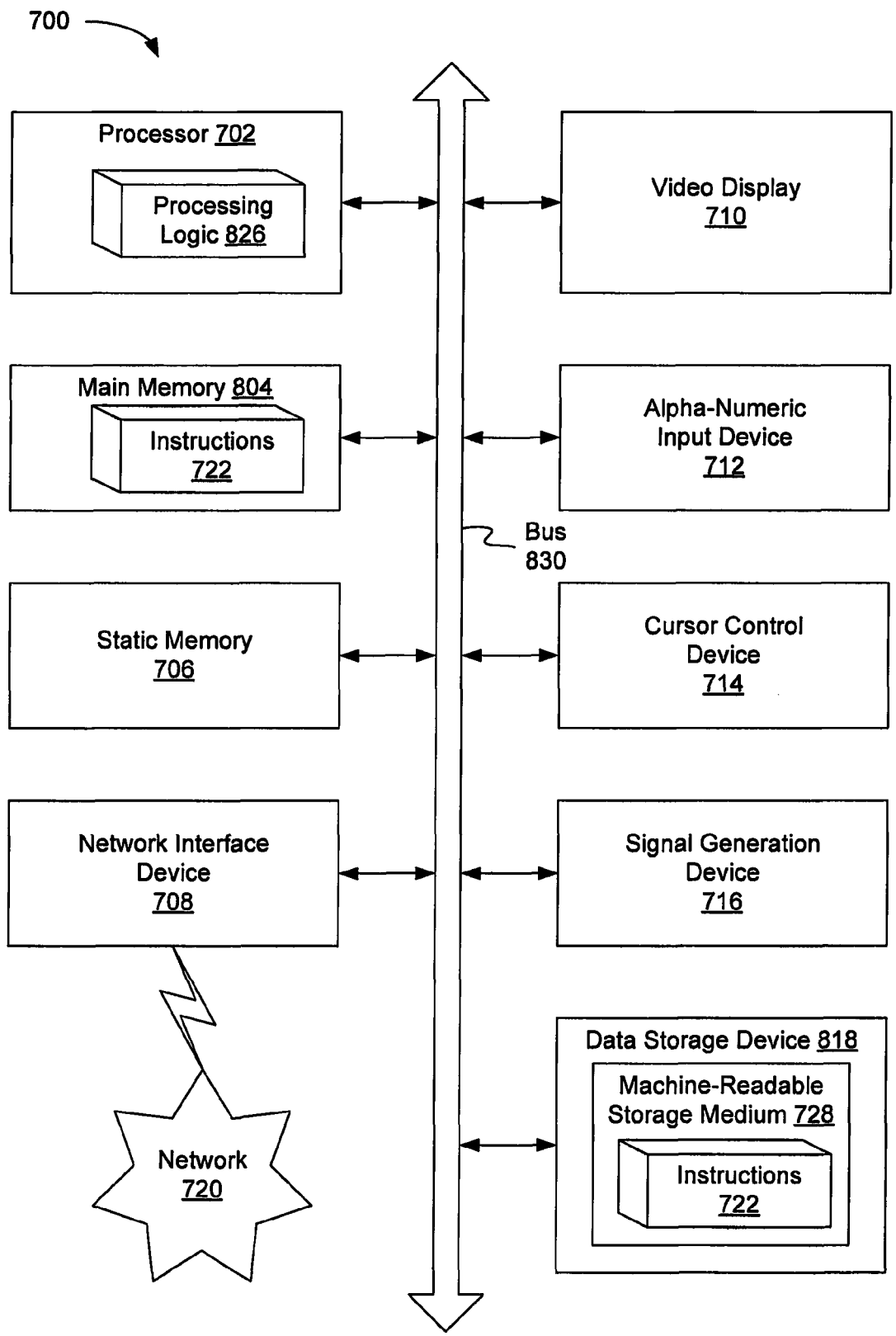
FIG. 7 illustrates a diagrammatic representation of a machine in the exemplary form of a computer system within which a set of instructions, for causing the machine to perform any one or more of the methods discussed herein, may be executed.

FIG. 7 illustrates a diagrammatic representation of a machine in the exemplary form of a computer system 700 within which a set of instructions, for causing the machine to perform any one or more of the methods discussed herein, may be executed. System 700 may be in the form of a computer system within which a set of instructions, for causing the machine to perform any one or more of the methods discussed herein, may be executed. In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methods discussed herein.

Exemplary computer system 700 includes a processing system (processor) 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)) and a data storage device 717, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. In certain implementations, processor 702 may be employed to execute instructions embodying example method 400 for determining envelope tracking (ET) parameters corresponding to various device states of a mobile communication device, in accordance with one or more aspects of the present disclosure.

Computer system 700 may further include a network interface device 707. Computer system 700 may also include a video display unit 710 (e.g., a liquid crystal display (LCD) or a cathode ray tube (CRT)), an alphanumeric input device 712 (e.g., a keyboard), a cursor control device 714 (e.g., a mouse) and a signal generation device 716 (e.g., a speaker).

Data storage device 718 may include a computer-readable storage medium 728 on which is stored one or more sets of instructions 722 embodying any one or more of the methods or functions described herein. Instructions 722 may also reside, completely or at least partially, within main memory 704 and/or within processor 702 during execution thereof by computer system 700, main memory 704 and processor 702 also constituting computer-readable media. The instructions may further be transmitted or received over a network 720 via network interface device 708.

While the computer-readable storage medium 728 is shown in an exemplary implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

The preceding description sets forth numerous specific details such as examples of specific systems, components, methods and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that certain implementations of the systems and methods described herein may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the present disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the present disclosure as described herein.

It is to be understood that the above description is intended to be illustrative and not restrictive. Many other implementations will be apparent to those of skill in the art upon reading and understanding the above description. The scope of the present disclosure should, therefore, be determined with reference to the appended claims, along with the full scope of equivalents to which such claims are entitled.

What is claimed is:

1. A method, comprising:
    identifying, using sensor data received from a sensor associated with a mobile communication device, a current state reflecting an operating environment of the mobile communication device;
    determining, using a ratio of a reflected power level at a circuit of the mobile communication device to an incident power level at the circuit, a voltage reflection coefficient of the circuit;
    determining, based on the voltage reflection coefficient, a measured impedance of the circuit;
    determining, by a processing device of the mobile communication device, that the measured impedance differs from a pre-defined base impedance value by more than a threshold value;
    locating, in a memory operatively coupled to the processing device, a set of envelope tracking (ET) parameter values corresponding to the current state of the mobile communication device and the measured impedance;
    determining, using the set of ET parameter values, a target supply voltage value to maximize an efficiency indicator of a power amplifier of the mobile communication device; and
    transmitting a signal reflective of the target supply voltage value to a voltage regulator circuit regulating supply voltage of the power amplifier.

2. The method of claim 1, wherein the efficiency indicator is a ratio of an output voltage of the power amplifier to the supply voltage of the power amplifier.

3. The method of claim 1, wherein the sensor is one of: a temperature sensor, a current sensor, a proximity sensor, a geo-location sensor, an accelerometer, or an optical sensor.

4. The method of claim 1, wherein the current state of the mobile communication device is one of: the mobile communication device is being held against a user's body, the mobile communication device is being held against a metal surface, the mobile communication device is being held at least a certain distance from an object that is larger than the mobile communication device, and the mobile communication device has an accessory plugged into a connectors.

5. A communication device, comprising:
    an antenna;
    an amplifier electrically coupled to the antenna;
    a voltage regulator circuit coupled to the amplifier, the voltage regulator circuit to adjust a supply voltage applied to the amplifier;
    a memory to store a plurality of sets of envelope tracking (ET) parameter values; and a processing device operatively coupled to the memory, the processing device to:
  determine a current state of the communication device;
  determine, using a ratio of a reflected power level at the amplifier to an incident power level at the amplifier, a voltage reflection coefficient of the amplifier;
  determine an impedance of the amplifier using the voltage reflection coefficient;
  determine that the impedance of the amplifier differs from a base impedance value by more than a threshold impedance difference value;
  locate, in a memory operatively coupled to the processing device, a set of envelope tracking (ET) parameter values corresponding to the current state of the communication device and the impedance of the amplifier; and
  determine, using the set of ET parameter values, a supply voltage value for the amplifier.

6. The communication device of claim 5, wherein the processing device is further to transmit a signal reflective of the supply voltage value to the voltage regulator circuit.

7. The communication device of claim 5, wherein the processing device is further to transmit a signal reflective of the supply voltage value to a transceiver feeding a radio frequency signal to the amplifier.

8. The communication device of claim 5, wherein the processing device is to determine the current state of the communication device by using one of: sensor data received from a sensor associated with the communication device, a value of a device parameter of the communication device, or device usage data of the communication device.

9. The communication device of claim 8, wherein the sensor is one of: a temperature sensor, a current sensor, a proximity sensor, a geo-location sensor, an accelerometer, or an optical sensor.

10. The communication device of claim 8, wherein the device parameter is one of: a battery voltage level, a received signal strength, a frequency band, or a frequency channel.

11. The communication device of claim 8, wherein the device usage data comprises one of: a first device usage parameter indicating that the communication device is engaged in a voice call or a second device usage parameter indicating that the communication device is engaged in a data transmission.

12. The communication device of claim 1, further comprising
  a two-branch coupler electrically coupled to the output of the amplifier to output a first signal reflective of the incident power level and a second signal reflective of the reflected power level.

13. A method, comprising:
  determining, using a ratio of a reflected power level at a circuit of a communication device to an incident power level at the circuit, a voltage reflection coefficient of the circuit;
  determining an impedance of the circuit using the voltage reflection coefficient;
  ascertaining that the impedance of the circuit differs from a base impedance value by more than a threshold impedance difference value;
  determining, in view of the ascertaining, a set of envelope tracking (ET) parameter values that correspond to a maximum value of an efficiency indicator; and
  transmitting a signal derived from the set of ET parameter values to one of: a voltage regulator circuit to regulate a supply voltage applied to an amplifier of the communication device or a transceiver to regulate a radio frequency signal applied to the amplifier.

14. The method of claim 13, wherein determining values of the ET parameters comprises iteratively modifying values of the ET parameters according to a certain optimization method until a maximum value of the efficiency indicator is reached.

15. The method of claim 14, wherein the efficiency indicator is provided by a ratio of an output voltage of the amplifier to a supply voltage of the amplifier.

16. The method of claim 13, further comprising:
  determining a current state of a communication device;
  loading, from a memory, a set of ET parameter values corresponding to the current state of the communication device and the impedance of the circuit; and
  using the set of ET parameter values as initial values in determining the ET parameter values that correspond to a maximum value of the efficiency indicator.

17. The method of claim 16, wherein the circuit is provided by the amplifier.

* * * * *